United States Patent [19]

Buysch et al.

[11] Patent Number: 5,399,600
[45] Date of Patent: Mar. 21, 1995

[54] STABILIZED, FLAME RESISTANT POLYCARBONATE MOULDING COMPOUNDS

[75] Inventors: Hans-Josef Buysch; Gerd Fengler, both of Krefeld; Gerhard Fennhoff, Willich; Klaus Horn, Dormagen, all of Germany

[73] Assignee: Bayer AG, Leverkusen, Germany

[21] Appl. No.: 289,777

[22] Filed: Aug. 12, 1994

[30] Foreign Application Priority Data

Aug. 24, 1993 [DE] Germany .................. 43 28 384.5

[51] Int. Cl.⁶ .................. C08K 5/49; C08K 5/42; C08L 69/00
[52] U.S. Cl. .................. 524/154; 524/162

[58] Field of Search .................. 524/154, 162; 562/35

[56] References Cited

U.S. PATENT DOCUMENTS

| | | | |
|---|---|---|---|
| 4,623,490 | 11/1986 | Bexten . | |
| 4,668,824 | 5/1987 | Jenck | 568/15 |
| 4,826,900 | 5/1989 | Ogoe | 524/154 |

*Primary Examiner*—David Buttner
*Attorney, Agent, or Firm*—Connolly & Hutz

[57] ABSTRACT

The present invention provides blends of polycarbonates and triphenylphosphane sulphonates and optionally fluorinated polyolefins and/or further customary additives, together with a process for the production of the blends according to the invention.

4 Claims, No Drawings

STABILIZED, FLAME RESISTANT POLYCARBONATE MOULDING COMPOUNDS

The present invention provides blends of thermoplastic, aromatic polycarbonates and a) triphenylphosphane sulphonates of the formula (I)

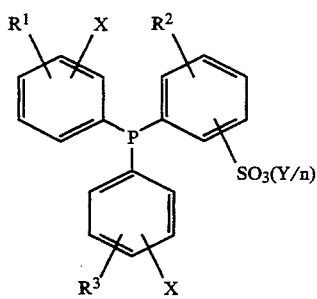

in quantities of 0.001 wt. % to 1 wt. % preferably of 0.005 wt. % to 0.8 wt. %, related to the weight of polycarbonate, in which $R^1$, $R^2$ and $R^3$ are identical or different and may be H, $C_1$–$C_4$ alkyl, $C_1$–$C_4$ alkoxy, F, Cl, carboxy or —CN, "X" is hydrogen or —$SO_3(Y/n)$, and n=1 if "Y" is an alkali cation and n=2 if "Y" is an alkaline earth cation, wherein the sulphonate groups are in m- or p-position relative to the phosphorus and the residues $R^1$, $R^2$ and $R^3$ are in o-, m- and p-position relative to the phosphorus, and optionally b) fluorinated polyolefins in quantities of 0.001 wt. % to 2 wt. %, preferably of 0.01 wt. % to 1 wt. %, again related to the weight of polycarbonate.

The blends according to the invention combine a favourable range of properties, they are flame resistant (V-0 classification to UL 94 at 3.2 mm thickness without addition of fluorinated polyolefins and at 1.6 mm thickness with addition of fluorinated polyolefins) and moreover have colour stability when exposed to heat. An additive is required only for flame retardancy and for stabilisation, transparent moulding compounds are obtained, it is possible to impart flame retardant properties without halogen and stabilisation is surprisingly achieved despite the electro-negative substitution of the phosphorus.

It is known to impart flame retardant properties to polycarbonates with various alkali or alkaline earth sulphonates (see for example U.S. Pat. No. 3,933,734, U.S. Pat. No. 3,940,366, U.S. Pat. No. 3,953,399, U.S. Pat. No. 3,926,908, U.S. Pat. No. 4,104,246 and EP-0 392 252 (Le A 26 733)).

In our opinion, triphenylphosphane sulphonates of the formula (I) are not mentioned as flame retardants in these references, nor are they made obvious by them.

It is also known to stabilise polycarbonates with phosphanes (see for example EP-B1-0 043 998 (Le A 20 430), DE-OS 3 332 065 (Le A 22 588), EP-0 143 906 (Le A 22 588-EP) and DE-OS 3 933 545 (Le A 27 209)).

In our opinion, triphenylphosphane sulphonates of the formula (I) are not mentioned in these references as stabilisers, nor indeed as flame retardants.

In the latter DE-OS 3 933 545 it is merely stated (page 8, line 57) that the polycarbonates described therein may also contain flame retardants.

It is also known to make combined use of salts with fluorinated polyolefins for flame proofing polycarbonates (see for example DE-OS 2 535 262, DE-OS 2 744 016 and the already mentioned EP-0 392 252).

In our opinion, triphenylphosphane sulphonates of the formula (I) in combination with fluorinated polyolefins are not mentioned as flame retardants in these references, nor are they made obvious by them.

Thermoplastic, aromatic polycarbonates according to the invention are both homopolycarbonates and copolycarbonates; the polycarbonates may be linear or branched in a known manner.

A proportion of up to 80 mol. %, preferably of 20 mol. % to 50 mol. % of the carbonate groups in the suitable polycarbonates according to the invention may be replaced with aromatic dicarboxylic acid ester groups. Such polycarbonates, which contain incorporated in their molecular chains acid groups of both carbonic acid and of aromatic dicarboxylic acids are correctly known as aromatic polyester carbonates. For simplicity's sake they should be taken in the present application to be included in the superordinate class of thermoplastic aromatic polycarbonates.

The polycarbonates to be stabilised according to the invention are produced in a known manner from diphenols, carbonic acid derivatives, optionally chain terminators and optionally branching agents, wherein for the production of polyester carbonates some of the carbonic acid derivatives are replaced with aromatic dicarboxylic acids or derivatives of the dicarboxylic acids, in fact in accordance with the carbonate structural units in the aromatic polycarbonates to be replaced with aromatic dicarboxylic acid ester structural units.

Details relating to the production of polycarbonates are known and have been published in hundreds of patents over the last approximately 40 years. Reference is made here merely to the following, Schnell, *Chemistry and Physics of Polycarbonates, Polymer Reviews*, vol. 9, Interscience Publishers, New York, London, Sydney 1964, D. C. Prevorsek, B. T. Debona and Y. Kesten, Corporate Research Center, Allied Chemical Corporation, Morristown, N.J. 07960, *Synthesis of Poly(ester Carbonate) Copolymers in Journal of Polymer Science, Polymer Chemistry Edition*, vol. 18, 75–90 (1980) D. Freitag, U. Grigo, P. R. Müller, H. Nouvertne', Bayer AG, *Polycarbonates in Encyclopedia of Polymer Science and Engineering*, vol. 11, second edition, 1988, pages 648–718 and, finally, Dres. U. Grigo, K. Kircher and P. R. Müller *Polycarbonate* in Becker/Braun, *Kunststoff-Handbuch*, vol. 3/1, *Polycarbonate, Polyacetale, Polyester, Celluloseester*, Carl Hanser Verlag Munich, Vienna 1992, pages 117-299.

The thermoplastic polycarbonates including the thermoplastic, aromatic polyester carbonates have average molecular weights $\overline{M}_w$ (determined by measuring relative viscosity in $CH_2Cl_2$ at 25° C. and at a concentration of 0.5 g per 100 ml of $CH_2Cl_2$) of 12,000 to 120,000, preferably of 18,000 to 80,000 and in particular from 22,000 to 60,000.

Diphenols suitable for the production of the polycarbonates to be stabilised according to the invention are, for example, hydroquinone, resorcinol, dihydroxydiphenyls, bis-(hydroxyphenyl)alkanes, bis-(hydroxyphenyl)cycloalkanes, bis-(hydroxyphenyl)sulphides, bis-(hydroxyphenyl)ethers, bis-(hydroxyphenyl)ketones, bis-(hydroxyphenyl)sulphones, bis-(hydroxyphenyl)sulphoxides, α,α'-bis-(hydroxyphenyl)diisopropylbenzenes, together with the ring-alkylated and ring-halogenated compounds thereof.

Preferred diphenols are, 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulphone, 2,4-bis-(3,5-dimethyl-4-hydroxyphenyl)-2-methylbutane, 1,1-bis-(4-hydroxyphenyl)-p-diisopropylbenzene, 1,1-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)propane and 1,1-bis-(4-hydroxyphenyl)-3,3,5-trimethylcyclohexane.

Particularly preferred diphenols are 2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

These and other suitable diphenols are, for example, described in the U.S. Pat. Nos. 3,028,635, 2,999,835, 3,148,172, 2,991,273, 3,271,367, 4,982,014 and 2,999,846, in DE-OS 1 570 703, DE-OS 2 063 050, DE-OS 2 036 052, DE-OS 2 211 956 and DE-OS 3 832 396, French patent 1,561,518, in the monograph *H. Schnell, Chemistry and Physics of Polycarbonates*, Interscience Publishers, New York 1964 and in the Japanese published patent applications 62039/1986, 62040/1986 and 105550/1986.

In the case of the homopolycarbonates, only one diphenol is used, in the case of the copolycarbonates, two or more diphenols are used.

Both monophenols and monocarboxylic acids are suitable chain terminators. Suitable monophenols are phenol itself, alkylphenols such as cresols, p-tert.-butylphenol, p-n-octylphenol, p-iso-octylphenol, p-n-nonylphenol and p-iso-nonylphenol, halophenols such a p-chlorophenol, 2,4-dichlorophenol, p-bromophenol and 2,4,6-tribromophenol.

Suitable monocarboxylic acids are benzoic acid, alkylbenzoic acids and halobenzoic acids.

Preferred chain terminators are phenols of the formula (I)

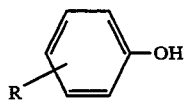

(I)

in which R is a branched or unbranched $C_8$ and/or $C_9$ alkyl residue.

The quantity of chain terminator to be used is 0.5 mol. % to 10 mol. %, related to the particular molar quantities of diphenols used. The chain terminator may be added before, during or after phosgenation.

Suitable branching agents are the tri- or higher functional compounds known in polycarbonate chemistry, in particular those with three or more than three phenolic OH groups.

Suitable branching agents are, for example, phloroglucinol, 4,6-dimethyl-2,4,6-tri-(4-hydroxyphenyl)-2-heptene, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis-(4-hydroxyphenyl)cyclohexyl]propane, 2,4-bis-(4-hydroxyphenylisopropyl)phenol, 2,6-bis-(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)orthoterephthalic acid ester, tetra-(4-hydroxyphenyl)methane, tetra-(4-(4-hydroxyphenylisopropyl)phenoxy)methane and 1,4-bis-(4',4''-dihydroxytriphenyl)methyl)benzene together with 2,4-dihydroxybenzoic acid, trimesic acid, cyanuric chloride and 3,3-bis-(3-methyl-4-hydroxyphenyl)-2-oxo-2,3-dihydroindole.

The quantity of the optionally used branching agents is 0.05 mol. % to 2 mol. %, again related to the particular molar quantity of diphenols used.

The branching agents may either be introduced into the aqueous alkaline phase with the diphenols and the chain terminators, or added prior to phosgenation dissolved in an organic solvent.

All these measures for the production of polycarbonates are familiar to the person skilled in the art.

Aromatic dicarboxylic acids suitable for the production of the polyester carbonates are, for example, orthophthalic acid, terephthalic acid, isophthalic acid, tert.-butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyletherdicarboxylic acid, 4,4'-diphenylsulphonedicarboxylic acid, 2,2-bis-(4-carboxyphenyl)propane, trimethyl-3-phenylindane-4,5'-dicarboxylic acid.

Of the aromatic dicarboxylic acids, terephthalic acid and/or isophthalic acid are particularly preferably used.

Dicarboxylic acid derivatives are the dicarboxylic acid dihalides and dicarboxylic acid diaryl esters, in particular the dicarboxylic acid dichlorides and dicarboxylic acid diphenyl esters.

The carbonate groups are replaced with the aromatic dicarboxylic acid groups substantially stoichiometrically and also quantitatively, such that the molar ratio of the reaction partners is also reflected in the finished polyester carbonate. The aromatic dicarboxylic acid ester groups may be incorporated both randomly and in blocks.

The preferred production methods for the polycarbonates, including the polyester carbonates, to be stabilised according to the invention are the known interfacial process and the known melt transesterification process.

In the first case, the carbonic acid derivative is preferably phosgene, in the latter case preferably diphenyl carbonate.

Catalysts, solvents, working up, reaction conditions etc. are sufficiently well described and known in both cases.

In the triphenylphosphane sulphonates of the formula (I), $R^1$ to $R^3$ are preferably H, $CH_3$ or $CH_3$—O—, particularly preferably H, preferably at least one X is H, particularly preferably both instances of X are H, Y is preferably Li, Na, K, Mg or Ca, particularly preferably Na, K, Mg or Ca, the sulphonate groups are preferably in m-position relative to the phosphorus and the residues $R^1$ to $R^3$ are preferably in o- or p-position relative to the phosphorus, and very particularly preferably in p-position.

The sulphonates (I) to be used according to the invention are known from the literature (see for example EP-0 287 066, 0 355 837, 0 041 134, DE-OS 4 006 112, 2 627 354, 3 235 030, 3 431 643, 2 700 904, 2 733 516 and DE-OS 2 627 354, together with *Monatshefte* 96, pages 2051–2057 (1965) or *J. Chem. Soc.* 1958, pages 276–288) or are obtainable using processes known from the literature.

Suitable triphenylphosphane sulphonates of the formula (I) are, for example, the alkali and alkaline earth salts of (p-sulphophenyl)diphenylphosphane, (m-sulphophenyl)diphenylphosphane, (p-sulpho-o-methylphenyl)-di-(o-methylphenyl)phosphane, (m-sulpho-p-methylphenyl)-di-(p-methylphenyl)phosphane, (p-sulpho-o-methoxyphenyl)-di-(o-methoxyphenyl)phosphane, (m-sulpho-p-methoxyphenyl)-di-(p-methoxyphenyl)phosphane, (m-sulphophenyl)-(p-carboxyphenyl)phenylphosphane, (m-sulpho-p-methylphenyl)-diphenylphosphane, (p-sulphophenyl)-di-(p-methoxyphenyl)phosphane, (p-sulphophenyl)-di-(p-methylphenyl)phosphane, (m-sulpho-p-ethylphenyl)-di-(p-ethylphenyl)phosphane and of (m-sulpho-p-chlorophenyl)-di-(p-chlorophenyl)phosphane;

the alkali and alkaline earth salts of di-(m-sulphophenyl)diphenylphosphane, di-(m-sulpho-o-methylphenyl)-(o-methylphenyl)phosphane, di-(p-sulphophenyl)-phenylphosphane, di-(m-sulpho-p-methylphenyl)-(p-methylphenyl)phosphane, di-(m-sulpho-p-methoxyphenyl)-(p-methoxyphenyl)phosphane, di-(m-sulpho-p-chlorophenyl)-(p-chlorophenyl)phosphane and of (p-sulphophenyl)-(m-sulphophenyl)phenylphosphane;

the alkali salts of tri-(p-sulphophenyl)phosphane, tri-(m-sulphophenyl)phosphane, tri-(m-sulpho-p-methylphenyl)phosphane, tri-(m-sulpho-p-chlorophenyl)phosphane, tri-(m-sulpho-p-methoxyphenyl)phosphane, tri-(m-sulpho-p-ethylphenyl)phosphane and of tri-(p-sulpho-o-methylphenyl)phosphane.

The salts are particularly preferably used in quantities of 0.01 to 0.6 wt. % and very particularly preferably in quantities of 0.02 to 0.5 wt. %, related to the weight of polycarbonate.

The suitable component b) fluorinated polyolefins according to the invention are polymers with fluorine contents of 65 to 76 wt. %, preferably 70 to 76 wt. %. Examples are polytetrafluoroethylene, tetrafluoroethylene/hexafluoropropylene copolymers or tetrafluoroethylene copolymers with small quantities of copolymerisable ethylenically unsaturated monomers containing no fluorine. The polymers are known. They may be produced using known processes, such as for example by polymerisation of tetrafluoroethylene in an aqueous medium with a free radical forming catalyst, for example sodium, potassium or ammonium peroxydisulphate at pressures of 7 to 71 kg/cm$^2$ and at temperatures of 0° to 200° C., preferably at temperatures of 20° to 100° C. (For further details, see for example U.S. Pat. No. 2,393,967). The average particle sizes of the fluorinated polyolefins are preferably between 0.05 μm and 20 μm.

The blends according to the invention are produced in a known manner by melt-compounding or melt-extrusion at temperatures of between 260° C. and 360° C., preferably between 260° C. and 300° C. once components a) and optionally b) have been either consecutively or simultaneously mixed into the polycarbonates at 25° C. (room temperature) or at higher temperatures.

The present invention thus also provides a process for the production of the blends according to the invention from thermoplastic, aromatic polycarbonates and the components a) and optionally b), which process is characterised in that component a) and optionally component b) is mixed into the polycarbonate at 25° C. or at a higher temperature and melt-compounding or melt-extrusion is then performed in customary equipment at temperatures of between 260° C. and 360° C., preferably between 260° C. and 300° C.

Component a) and optionally component b) may also be added to the appropriate thermoplastic aromatic polycarbonates as a concentrate using the so-called masterbatch process, wherein such concentrates contain from 5 to 20 wt. % of component a) and optionally b) in polycarbonate.

Suitable additives or added materials customary for thermoplastic polycarbonates, such as glass fibre, fillers, pigments, UV stabilisers and mould release agents may also be added using the customary methods for polycarbonates.

The present invention thus also provides the blends according to the invention made from the thermoplastic, aromatic polycarbonates, components a) and optionally b), which are characterised in that they additionally contain glass fibre, fillers, pigments, UV stabilisers and/or mould release agents in the quantities customary for polycarbonates.

The present invention furthermore provides a process for the production of these last stated blends, which is characterised in that thermoplastic, aromatic polycarbonates are mixed with components a) and optionally b), optionally together with glass fibre, fillers, pigments, UV-stabilisers and/or mould release agents at 25° C. or at higher temperatures and melt-compounding or melt-extrusion is then performed in customary equipment at temperatures of between 260° C. and 360° C., preferably between 260° C. and 300° C.

Here too, the masterbatch process may again be used and the individual additives may be added to the polycarbonate in the form of a concentrate.

The blends according to the invention may be processed in a known manner on known machinery into any desired mouldings, for example sheets, tubes, bottles and films.

These products and the blends according to the invention on which they are based are characterised by good flame resistance and thermal stability and, provided that no disruptive additives such as pigments, glass fibre, fillers etc. are added, by good transparency as well.

The products thus have many industrial applications, for example in electronics, electrical engineering and construction.

Suitable mouldings are, for example, sheets, switch box enclosures and viewing windows in the electronics sector.

The mouldings produced from the blends according to the invention were treated at elevated temperature for example by hot air ageing at 130° C. for 1,000 hours. Transmission was measured to ASTM 1003, the yellowness index to ASTM D.

Examples of synthesis of triphenylphosphanesulphonic acid salts

I. 26 g of triphenylphosphane were added over a period of 15 to 30 minutes to 260 g of 20% oleum at room temperature under a nitrogen atmosphere and with stirring, which was continued for 18 h at 25° C. The reaction mixture was poured over 2 kg of ice and adjusted to pH 6.5 with concentrated sodium hydroxide solution and, after standing overnight, the precipitated crystals were suction filtered and dried: 28 g.

These crystals were decocted three times with methanol, the clear filtrates combined and evaporated and the residue dried under a vacuum: 20.7 g of colourless crystals,

| Elemental analysis | P % | S % |
| --- | --- | --- |
| actual | 6.5 | 13.2 |
| calculated | 6.6 | 13.7 | calculated for the disodium salt of triphenylphosphanedisulphonic acid.

II. 26 g of triphenylphosphane were added in portions over approximately 30 minutes to 108 g of 20% oleum at room temperature under nitrogen with stirring and cooling and the clear mixture was heated to 82° C. for 40 minutes. After this heating, a sample of the reaction mixture formed a clear solution in water. After cooling, the mixture was poured over 60 g of ice and adjusted to pH 7 with concentrated sodium hydroxide solution, the crystals which precipitated out of the cooled solution were suction filtered, dried and decocted with methanol two to three times. The combined clear filtrates were evaporated and the residue dried under a vacuum: 25 g of colourless crystals,

| Elemental analysis | P | S |
| --- | --- | --- |
| actual | 7.9 | 8.9 |
| calculated | 8.5 | 8.8 | calculated for the sodium salt of triphenylphosphanesulphonic acid.

EXAMPLES

Example 1

99.9 wt. % of an aromatic polycarbonate prepared from 2,2-bis-(4-hydroxyphenyl)propane (melt index 8, measured to DIN 53 735) with phenol as chain terminator were melted at 280° C. in a twin screw extruder. 0.1 wt. % of sodium triphenylphosphane sulphonate (example II) was then added directly to the polycarbonate melt. The polymer strand was cooled, pelletised, the pellets dried at 80° C. in a vacuum drying cabinet and injection moulded at 280° C. into test pieces of dimensions 127×12×3.2 mm.

The test bars were then subjected to flammability testing to UL 94 (flammability of solid plastic samples, Underwriters' Laboratories) and placed in flammability class V0.

Example 2

99.9 wt. % of an aromatic polycarbonate prepared from 2,2-bis-(4-hydroxyphenyl)propane (melt index 8, measured to DIN 53 735) with phenol as chain terminator were melted at 280° C. in a twin screw extruder. 0.1 wt. % of disodium triphenylphosphane disulphonate (example I) was then added directly to the polycarbonate melt. The polymer strand was cooled, pelletised, the pellets dried at 80° C. in a vacuum drying cabinet and injection moulded at 280° C. into test pieces of dimensions 127×12×3.2 mm.

The test bars were then subjected to flammability testing to UL 94 (flammability of solid plastic samples, Underwriters' Laboratories) and placed in flammability class V0.

Example 3

99.7 wt. % of an aromatic polycarbonate prepared from 2,2-bis-(4-hydroxyphenyl)propane (melt index 11, measured to DIN 53 735) with phenol as chain terminator were melted at 280° C. in a twin screw extruder. A mixture of 0.2 wt. % of sodium triphenylphosphane sulphonate and 0.1 wt. % of fluorinated polyolefin was then added directly to the polycarbonate melt. The polymer strand was cooled, pelletised, the pellets dried at 80° C. in a vacuum drying cabinet and injection moulded at 280° C. into test pieces of dimensions 127×12×1.6 mm.

The test bars were then subjected to flammability testing to UL 94 (flammability of solid plastic samples, Underwriters' Laboratories) and placed in flammability class V0.

Example 4

99.7 wt. % of an aromatic polycarbonate prepared from 2,2-bis-(4-hydroxyphenyl)propane (melt index 11, measured to DIN 53 735) with phenol as chain terminator were melted at 280° C. in a twin screw extruder. A mixture of 0.2 wt. % of disodium triphenylphosphane disulphonate and 0.1 wt. % of fluorinated polyolefin was then added directly to the polycarbonate melt. The polymer strand was cooled, pelletised, the pellets dried at 80° C. in a vacuum drying cabinet and injection moulded at 280° C. into test pieces of dimensions 127×12×1.6 mm.

The test bars were then subjected to flammability testing to UL 94 (flammability of solid plastic samples, Underwriters' Laboratories) and placed in flammability class V0.

Comparative Example 1

100 wt. % of an aromatic polycarbonate prepared from 2,2-bis-(4-hydroxy)propane (melt index 8, measured to DIN 53 735) with phenol as chain terminator were melted at 280° C. in a twin screw extruder. The polymer strand was cooled and pelletised.

The pellets were dried at 80° C. in a vacuum drying cabinet and injection moulded at 280° C. into test pieces of dimensions 127×12×3.2 mm and 127×12×1.6 mm.

The test bars were then subjected to flammability testing to UL 94 (flammability of solid plastic samples, Underwriters' Laboratories) and both thicknesses were placed in flammability class V2.

Comparative Example 2

99.9 wt. % of an aromatic polycarbonate prepared from 2,2-bis-(4-hydroxy)propane (melt index 8, measured to DIN 53 735) with phenol as chain terminator were melted at 280° C. in a twin screw extruder. 0.1 wt. % of potassium perfluorobutane sulphonate was then added directly to the polycarbonate melt. The polymer strand was cooled and pelletised.

The pellets were dried at 80° C. in a vacuum drying cabinet and injection moulded at 280° C. into test pieces of dimensions 127×12×3.2 mm and 127×12×1.6 mm.

The test bars were then subjected to flammability testing to UL 94 (flammability of solid plastic samples, Underwriters' Laboratories) and both thicknesses were placed in flammability class V2.

Small colour sample sheets of dimensions 60×40×4 mm were injection moulded from the moulding compounds from examples 1, 2 and comparative example 1 at melt temperatures of 300° C. and 360° C. and their yellowness index (NY) and transmission values TY were then measured immediately and then after various periods of exposure to light (see following table).

Yellowness Index
to DIN 6164 ASTM D 1925
Measurements with Hunterlab illuminant C (°C./d) without gloss

| Sample | Exposure h | Standard colour values TY | Yellowness index |
|---|---|---|---|
| Comparative | 0 | 89.36 | 5.0 |
| example 1 | 500 | 89.65 | 6.1 |
| Example 2 | 0 | 88.77 | 5.3 |
|  | 500 | 88.67 | 5.8 |
| Example 1 | 0 | 88.29 | 5.7 |
|  | 500 | 88.57 | 6.2 |
| Comparative | 0 | 89.76 | 5.2 |
| example 1 | 500 | 89.47 | 6.7 |
| Example 2 | 0 | 88.96 | 5.2 |
|  | 500 | 88.91 | 6.1 |
| Example 1 | 0 | 88.33 | 5.4 |
|  | 500 | 83.50 | 6.8 |

We claim:

1. Blends of thermoplastic, aromatic polycarbonates and a) triphenylphosphane sulphonates of the formula (I)

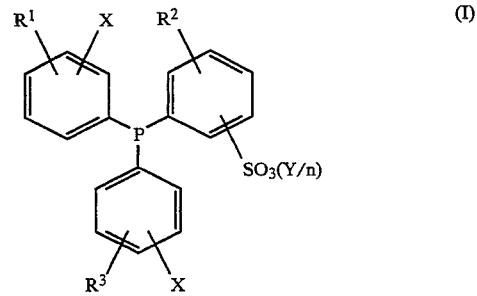

in quantities of 0.001 wt. % to 1 wt. %, related to the weight of polycarbonate, in which "$R^1$, $R^2$ and $R^3$" are identical or different and may be H, $C_1$–$C_4$ alkyl, $C_1$–$C_4$ alkoxy, F, Cl, carboxy or —CN, "X" is hydrogen or —$SO_3(Y/n)$, and n=1 if "Y" is an alkali cation and n=2 if "Y" is an alkaline earth cation, wherein the sulphonate groups are in m- or p-position relative to the phosphorus and the residues $R^1$, $R^2$ and $R^3$ are in o-, m- and p-position relative to the phosphorus, and optionally b) fluorinated polyolefins in quantities of 0.001 wt. % to 1 wt. %, again related to the weight of polycarbonate.

2. Process for the production of the blends according to claim 1, characterised in that component a) and optionally component b) are mixed into the polycarbonate at 25° C. or at a higher temperature and melt-compounding or melt-extrusion is then performed in customary equipment at temperatures of between 260° C. and 360° C.

3. Blends according to claim 1, characterised in that they additionally contain glass fibre, fillers, pigments, UV stabilisers and/or mould release agents in the quantities customary for polycarbonates.

4. Process for the production of the blends according to claim 3, characterised in that thermoplastic, aromatic polycarbonates are mixed with components a) and optionally b), additionally together with glass fibre, fillers, pigments, UV stabilisers and/or mould release agents at 25° C. or at higher temperatures and melt-compounding or melt-extrusion is then performed in customary equipment at temperatures of between 260° C. and 360° C.

* * * * *